US012391527B2

United States Patent
Sasaki

(10) Patent No.: US 12,391,527 B2
(45) Date of Patent: Aug. 19, 2025

(54) LOAD TRANSPORT SYSTEM, METHOD OF LOAD TRANSPORT SYSTEM, AND NON-TRANSITORY COMPUTER-READABLE RECORDING MEDIUM

(71) Applicant: Panasonic Intellectual Property Management Co., Ltd., Osaka (JP)

(72) Inventor: Yoshiki Sasaki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 193 days.

(21) Appl. No.: 18/351,525

(22) Filed: Jul. 13, 2023

(65) Prior Publication Data

US 2023/0356991 A1 Nov. 9, 2023

Related U.S. Application Data

(63) Continuation of application No. PCT/JP2021/039387, filed on Oct. 26, 2021.

(30) Foreign Application Priority Data

Feb. 5, 2021 (JP) .................. 2021-017460

(51) Int. Cl.
  *B66F 9/06* (2006.01)
  *B66F 9/075* (2006.01)
(52) U.S. Cl.
  CPC ............ *B66F 9/0755* (2013.01); *B66F 9/063* (2013.01)

(58) Field of Classification Search
  CPC .............................. B66F 9/0755; B66F 9/063
  See application file for complete search history.

(56) References Cited

U.S. PATENT DOCUMENTS

| | | | |
|---|---|---|---|
| 2017/0285644 A1 | 10/2017 | Ichinose et al. | |
| 2018/0060765 A1 | 3/2018 | Hance et al. | |
| 2018/0089616 A1* | 3/2018 | Jacobus ............... | G05D 1/0274 |
| 2020/0174473 A1 | 6/2020 | Moriya et al. | |

FOREIGN PATENT DOCUMENTS

| | | |
|---|---|---|
| JP | 2003-081410 | 3/2003 |
| JP | 2017-178567 | 10/2017 |
| JP | 2018-162122 | 10/2018 |
| JP | 2019-531990 | 11/2019 |
| JP | 2020-087206 | 6/2020 |

OTHER PUBLICATIONS

International Search Report of PCT application No. PCT/JP2021/039387 dated Jan. 18, 2022.

* cited by examiner

*Primary Examiner* — Mathew Franklin Gordon
(74) *Attorney, Agent, or Firm* — Rimon P.C.

(57) ABSTRACT

A load transport system includes a first mover, a second mover that performs a job of transporting a load, and a processor. The first mover includes a first driver that moves the first mover and a first sensor that outputs sensor data indicating a three-dimensional distribution of objects surrounding the first mover. The second mover includes a second driver that moves the second mover and a loader that performs an operation of loading the load. The processor makes a motion plan of the second mover to cause the loader to operate in response to the sensor data.

17 Claims, 18 Drawing Sheets

FIG. 3A

| SECOND MOVER ID | OVERALL WIDTH | OVERALL DEPTH | OVERALL HEIGHT | LENGTH OF FORK | WIDTH OF FORK |
|---|---|---|---|---|---|
| 001 | w1 [m] | d1 [m] | h1 [m] | fl1 [m] | fw1 [m] |
| 002 | w2 [m] | d2 [m] | h2 [m] | fl2 [m] | fw2 [m] |
| 003 | ... | ... | ... | ... | ... |
| ... | ... | ... | ... | ... | ... |

FIG. 3B

| SHELF ID | WIDTH | DEPTH | HEIGHT |
|---|---|---|---|
| A001 | aa1 [m] | bb1 [m] | cc1 [m] |
| A002 | ... | ... | ... |
| ... | ... | ... | ... |

FIG. 6

| GROUP | COORDINATES |
|---|---|
| A | (x1, y0, z0) |
| A | (x2, y0, z0) |
| A | (x3, y0, z0) |
| A | (x4, y0, z0) |
| A | (x5, y0, z0) |
| B | (x0, y1, z1) |
| B | (x0, y1, z2) |
| B | (x0, y1, z3) |
| B | (x0, y1, z4) |
| ... | ... |
| ... | ... |

FIG. 9

| STEP | TARGET | MOVING DIRECTION | AMOUNT OF TRAVEL |
|---|---|---|---|
| 000 | START | | |
| 001 | SECOND MOVER | COUNTERCLOCKWISE ROTATION | $\alpha°$ |
| 002 | SECOND MOVER | X | S1 m |
| 003 | SECOND MOVER | Z | S2 m |
| 004 | SECOND MOVER | X | S3 m |
| 005 | SECOND MOVER | Z | S4 m |
| 006 | SECOND MOVER | -X | S5 m |
| 007 | SECOND MOVER | -Z | S6 m |
| 008 | SECOND MOVER | CLOCKWISE ROTATION | $\beta°$ |
| 009 | END | | |

$D = (L1+L2) - (x0-x100)$

LOAD TRANSPORT SYSTEM, METHOD OF LOAD TRANSPORT SYSTEM, AND NON-TRANSITORY COMPUTER-READABLE RECORDING MEDIUM

BACKGROUND

1. Technical Field

The present disclosure relates to a load transport system, a method of the load transport system, and a non-transitory computer-readable recording medium.

2. Description of the Related Art

Development of autonomous movers transporting loads is in progress. For example, in currently developed systems, a work vehicle, such as an autonomously moving forklift, transports a load from a shelf to another place. A technique used in such a system recognizes with a range sensor a pallet, from which a load is picked up, in a load picking job of a forklift. To perform an accurate load picking job with the forklift, accurate position fixing of a relative position of the pallet with respect to the forklift is to be performed. Japanese Unexamined Patent Application Publication No. 2017-178567 discloses as a technique meeting such a demand a technique that accurately fixes a relative position of a pallet with respect to a forklift using a range sensor mounted on the forklift.

SUMMARY

One non-limiting and exemplary embodiment provides a technique that allows a load to be transported smoothly without mounting an expensive measurement device or a control device on a mover, such as a forklift.

In one general aspect, the techniques disclosed here feature a load transport system including a first mover, a second mover that performs a job of transporting a load, and a processor. The first mover includes a first driver that moves the first mover and a first sensor that outputs sensor data indicating a three-dimensional distribution of objects surrounding the first mover. The second mover includes a second driver that moves the second mover and a loader that performs an operation of loading a load. The processor makes a motion plan to cause the loader of the second mover to operate in response to the sensor data.

Generic or specific form of the disclosure may be implemented by a system, an apparatus, a method, an integrated circuit, a computer program, or a recording medium, such as a computer-readable recording disc. The generic or specific form of the disclosure may be implemented by a combination of the system, the apparatus, the method, the integrated circuit, the computer program and the recording medium. The computer readable recording medium may include a non-volatile recording medium, such a compact disc read-only memory (CD-ROM). The apparatus may include one or more devices. If the apparatus includes two or more devices, the devices may be installed within one housing of the apparatus or in two or more separate housings of the apparatus. In the context of the specification and the claims, the apparatus refers to not only a single apparatus but also a system including multiple apparatuses.

According to an embodiment of the disclosure, a load transport operation may be smoothly performed without mounting an expensive measurement device or a control device on a work mover.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 3A illustrates an example of data related to the second mover stored on a first memory;

FIG. 3B illustrates an example of data related to a load shelf stored on the first memory;

FIG. 6 illustrates an example of multiple points forming a group;

FIG. 9 illustrates an example of a motion plan;

DETAILED DESCRIPTIONS

Figure 1:
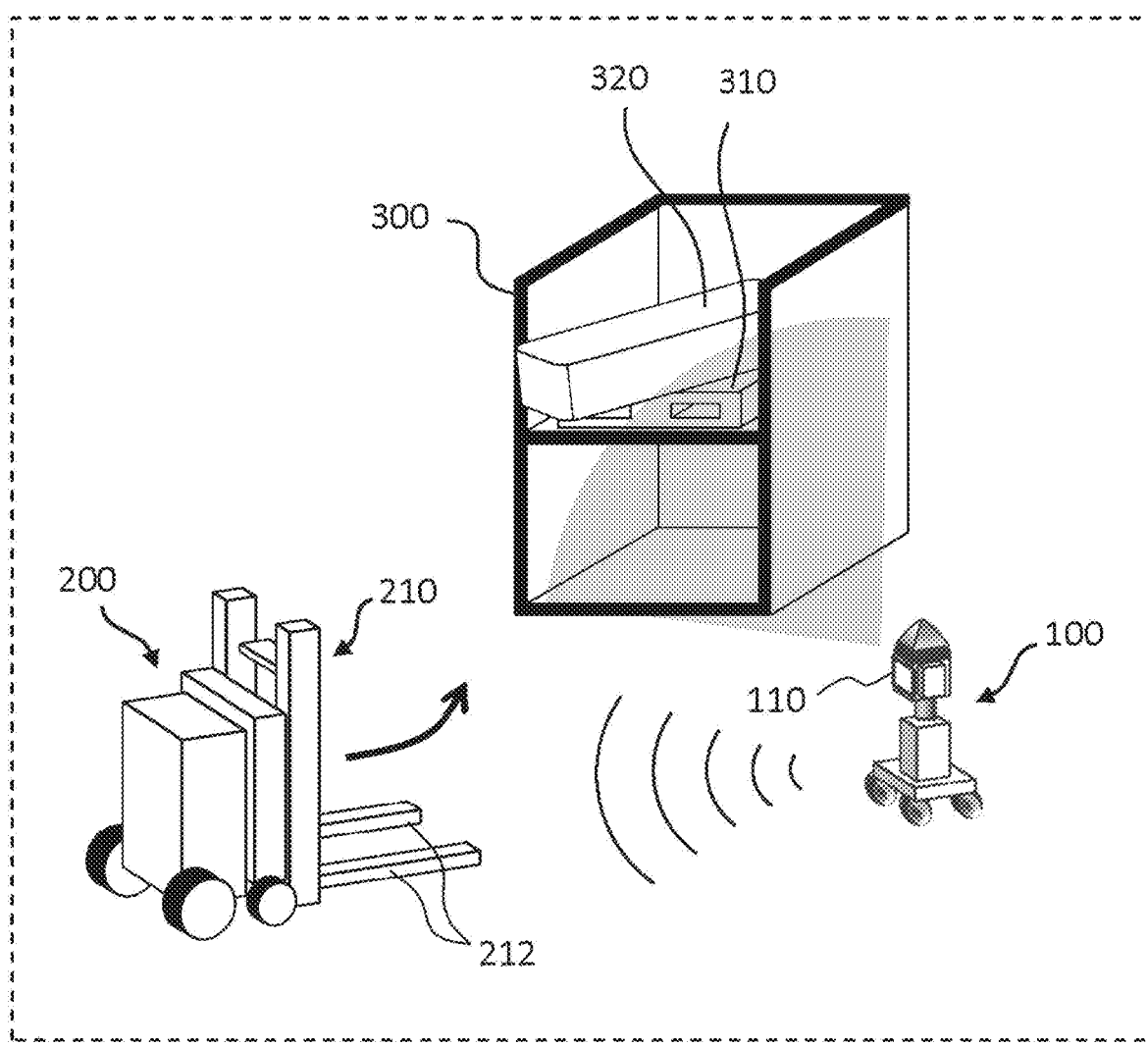
FIG. 1 schematically illustrates a configuration of a load transport system according to an embodiment of the disclosure.

Underlying Knowledge Forming Basis of the Present Disclosure

As described with reference to Japanese Unexamined Patent Application Publication No. 2017-178567, accurate loading work with an autonomously moving forklift involves causing the forklift to move to a position of a pallet from which a load is to be picked up. In a practical work environment, however, not only the forklift is to be accurately moved to the position of the pallet but also the state of the load on the pallet is to be accurately detected. If the load is protruded toward an approaching forklift from the pallet, the forklift may touch the load even if the forklift is moved accurately to the position of the pallet with the position of the pallet accurately detected. If collision of the forklift occurs, the load or the forklift may be damaged. To control collision, not only the position of the pallet from which the load is to be picked up is to be accurately detected but also a loading state of the load is to be accurately detected.

Japanese Unexamined Patent Application Publication No. 2017-178567 discloses a technique of detecting a position of two insertion holes of the pallet with a range sensor mounted on a forklift. The relative position and direction of the pallet with respect to the forklift are detected in response to the detected position of the two insertion holes. According to Japanese Unexamined Patent Application Publication No. 2017-178567, the detection of the loading state of the load is not contemplated.

Not only the position of the pallet from which the load is to be picked up but also the loading state of the load as a loading target may be detected. To this end, multiple sensors or a multi-function sensor and a high-efficiency control apparatus may be mounted on the forklift. To implement an autonomous control system, such as an automated warehouse, all the forklifts may be equipped with multiple sensors or multi-function sensor and a high-efficiency control apparatus, and an arithmetic apparatus. This may lead to an increase in the size of the control apparatus on the forklift and an increase in costs.

The above-described problem is common to movers, including the forklift, which automatically transport a load by sensing a surrounding environment with a sensor. The inventor of the disclosure has noticed the problem. The inventor has studied a system smoothly transporting a load at lower costs and has arrived at the concept embodiments of the disclosure.

A load transport system of the embodiment of the disclosure includes a first mover, a second mover that performs a job of transporting a load, and a processor. The first mover includes a first driver that moves the first mover and a first sensor that outputs sensor data indicating a three-dimensional distribution of objects surrounding the first mover. The second mover includes a second driver that moves the second mover and a loader that performs an operation of loading the load. The processor makes a motion plan to cause the loader of the second mover to operate in response to the sensor data.

The load transport system includes the first mover, the second mover that performs the job of transporting the load, and the processor. The first mover includes the first driver that moves the first mover and the first sensor that outputs the sensor data indicating the three-dimensional distribution of the objects surrounding the first mover. The second mover includes the second driver that moves the second mover and the loader that performs the operation of loading the load. The processor makes the motion plan of the second mover to cause the loader to operate in response to the sensor data and transmits to the second mover a control signal that causes the second driver and/or the loader to operate in accordance with the motion plan.

The configuration described above includes the first mover that is different from the second mover performing the job and senses a surrounding environment, and the processor that makes the motion plan of the second mover and causes the second mover to operate in accordance with the motion plan. The motion plan defines forward movement, backward movement, change of direction movement of the second mover, and/or a series of operations including load picking by the loader. In this configuration, load transport work may be smoothly performed without mounting an expensive sensor and a control device on the second mover.

The control signal may be a signal indicating the motion plan or a signal of one or more control commands generated in accordance with the motion plan. The second mover may include a control circuit that controls at least one of the second driver or the loader in response to the received control signal.

The processor may be mounted on the first mover or the second mover or may be external to the first mover and the second mover. If the processor is mounted on the first mover, the second mover operates in response to the control signal transmitted from the first mover. In such a configuration, the first mover is referred to as a "parent device" and the second mover is referred to as a "child device." The second mover may also be referred to as a "working mover."

The first driver may move the first mover in response to a relative position of the load with respect to the second mover indicated by the sensor data. For example, if the load is positioned behind the second mover or the load shelf and the position information on the load is difficult to obtain, the first mover may be moved to a location where the position information on the load is easier to obtain.

After the first mover is moved, the first sensor may acquire again the sensor data and transmit the acquired sensor data to the processor. The processor may update the motion plan in response to the sensor data that is acquired again. In such a process, the positional relationship of the second mover and the load may be accurately recognized based on the sensor data acquired from multiple locations and a more appropriate motion plan may thus result.

The processor may make the motion plan in response to the sensor data that has been output several times by the first sensor. For example, the processor may integrate the sensor data that has been acquired several times with the position and/or posture of the first mover changed and may make or update the motion plan in accordance with the integrated sensor data. In such an operation, the positional relationship of the second mover and the load may be more accurately recognized and a more appropriate motion plan may result.

The first mover may include an actuator that varies a height and/or an angle of the first sensor in response to the state of the load indicated by the sensor data. In this way, for example, if sufficient information on the position of the load is difficult to acquire with the load positioned behind the second mover or the load shelf, the first mover varies the height or the angle of the first sensor, resulting in more position information.

The system may include multiple working movers, each identical in configuration to the second mover. The processor may decide the motion plan of each working mover in response to the sensor data and transmit to each working mover the control signal that is based on the motion plan.

The system may include a third mover that includes a second sensor that outputs the sensor data indicating a three-dimensional distribution of surrounding objects. The processor may make or update the motion plan in response to the sensor data acquired by the first sensor and the sensor data acquired by the second sensor. In this configuration, the processor may acquire more position information on the surrounding objects in response to the sensor data acquired by the first mover and the second mover and may thus make a more appropriate motion plan. The third mover may or may not be identical in configuration to the first mover. The system may include three or more movers that acquire the sensor data.

The second mover may be a forklift having a fork used to transport the load placed on the pallet. The loader may include a lift that raises and lowers the fork. The motion plan may define the movement of the second mover and the raise and lower motion of the fork. In such a configuration, the loading operation using the forklift may be smoothly performed.

If a protrusion of the load from the pallet toward the forklift is detected in view of the sensor data, the processor makes the motion plan to cause the forklift to stop advancing before the forklift collides with the load in an operation that the forklift is moved forward to insert the fork into apertures of the pallet. In this configuration, the collision of the forklift with the load may be controlled and the load or the forklift may be free from being damaged by collision.

A method of another embodiment of the disclosure is performed by a computer in a load transport system including a first mover that includes a sensor that outputs sensor data indicating a three-dimensional distribution of surrounding objects and a second mover that performs a job of transporting a load. The method includes acquiring the sensor data output from the sensor, making a motion plan of the second mover in response to the sensor data, and transmitting to the second mover a control signal that causes the second mover to operate in response to the motion plan.

A computer program of another embodiment of the disclosure is executed by a computer in a load transport system including a first mover that includes a sensor that outputs sensor data indicating a three-dimensional distribution of surrounding objects and a second mover that performs a job of transporting a load. The computer program causes the computer to perform a process that includes acquiring the sensor data output from the sensor, making a motion plan of the second mover in response to the sensor data, and transmitting to the second mover a control signal that causes the second mover to operate in response to the motion plan.

Embodiments of the disclosure are described in detail below. The embodiments described below are general or specific examples. Numerical values, shapes, materials, elements, layouts of the elements, locations and connection configurations of the elements, steps, orders of the steps are recited for exemplary purposes only and are not intended to limit the disclosure. From among the elements in the embodiments, an element not recited in an independent claim indicating a generic concept may be construed as an optional element. The drawings are not necessarily drawn to scale. For example, in each drawing, scale is not necessarily consistent. In the drawings, elements substantially identical in configuration are designated with the same reference symbol and the discussion thereof is simplified or not repeated.

According to the disclosure, a circuit, a unit, an apparatus, an element, a portion of the element, and all or a subset of functional blocks in a block diagram may be implemented by one or more electronic circuits including a semiconductor device, a semiconductor integrated circuit (IC) chip, or a large-scale integrated (LSI) chip. The LSI chip or IC chip may be integrated into a single chip or multiple chips. For example, a functional block other than a memory element may be integrated into a single chip. The LSI chip and IC chip are quoted herein. Depending on the degree of integration, integrated circuits may be also referred to as a system LSI chip, a very large-scale integrated (VLSI) chip, or an ultra-large-scale integrated (ULSI) chip and these chips may also be used. Field programmable gate array (FPGA) that is programmed on an LSI chip after manufacturing the LSI chip may also be employed. Reconfigurable logic device permitting a connection in an LSI chip to be reconfigured or permitting a circuit region in an LSI chip to be set up may also be employed.

The function or operation of the circuit, the unit, the apparatus, the element, the portion of the element, and all or a subset of functional blocks may be implemented by a software program. In such a case, the software program may be stored on a non-transitory recording medium, such as one or more read-only memories (ROMs), an optical disk, or a hard disk. When the software program is executed by a processor, the function identified by the software program is thus performed by the processor and a peripheral device thereof. A system or an apparatus may include one or more non-transitory recording media, a processor, and a hardware device, such as an interface.

First Embodiment

A load transport system of a first embodiment of the disclosure is described below.

FIG. 1 schematically illustrates a configuration of the load transport system according to the first embodiment of the disclosure. The load transport system includes multiple movers. The movers include a first mover 100 and a second mover 200. The second mover 200 of the first embodiment is an automated guided forklift (AGF) and transports a pallet 310 and a load 320 on the pallet 310 placed on a load shelf 300. The first mover 100 includes a sensor 110 that senses a surrounding environment and outputs sensor data indicating a three-dimensional distribution of surrounding objects. The second mover 200 includes a loader 210 that performs an operation of loading the load 320. The loader 210 of the first embodiment includes a fork 212 and a lift that raises and lowers the fork 212. The first mover 100 includes a motion planner having the function of the processor. In response to the sensor data output from the sensor 110, the motion planner identifies the positions of the surrounding objects, such as the second mover 200 and the load 320, and makes the motion plan used for the second mover 200 to transport the load 320. The motion planner transmits to the second mover 200 data indicating the made motion plan. The data indicating the motion plan serves as a control signal that defines the operation of the second mover 200. In response to the received data on the motion plan, the second mover 200 moves to the vicinity of the load 320 and controls the operation of the loader 210. The second mover 200 transfers the load from a loading place, such as the load shelf 300, to the loader 210 of the second mover 200 and then transports the load to a specific place. The motion planner may be mounted on an apparatus different from the first mover 100.

Referring to FIG. 1, a single first mover 100 is illustrated, but the system may include multiple first movers 100. The system may also include multiple second movers 200. A single first mover 100 may make the motion plans of multiple second movers 200 and transmit control signals indicating the motion plans respectively to the second movers 200.

Figure 2:
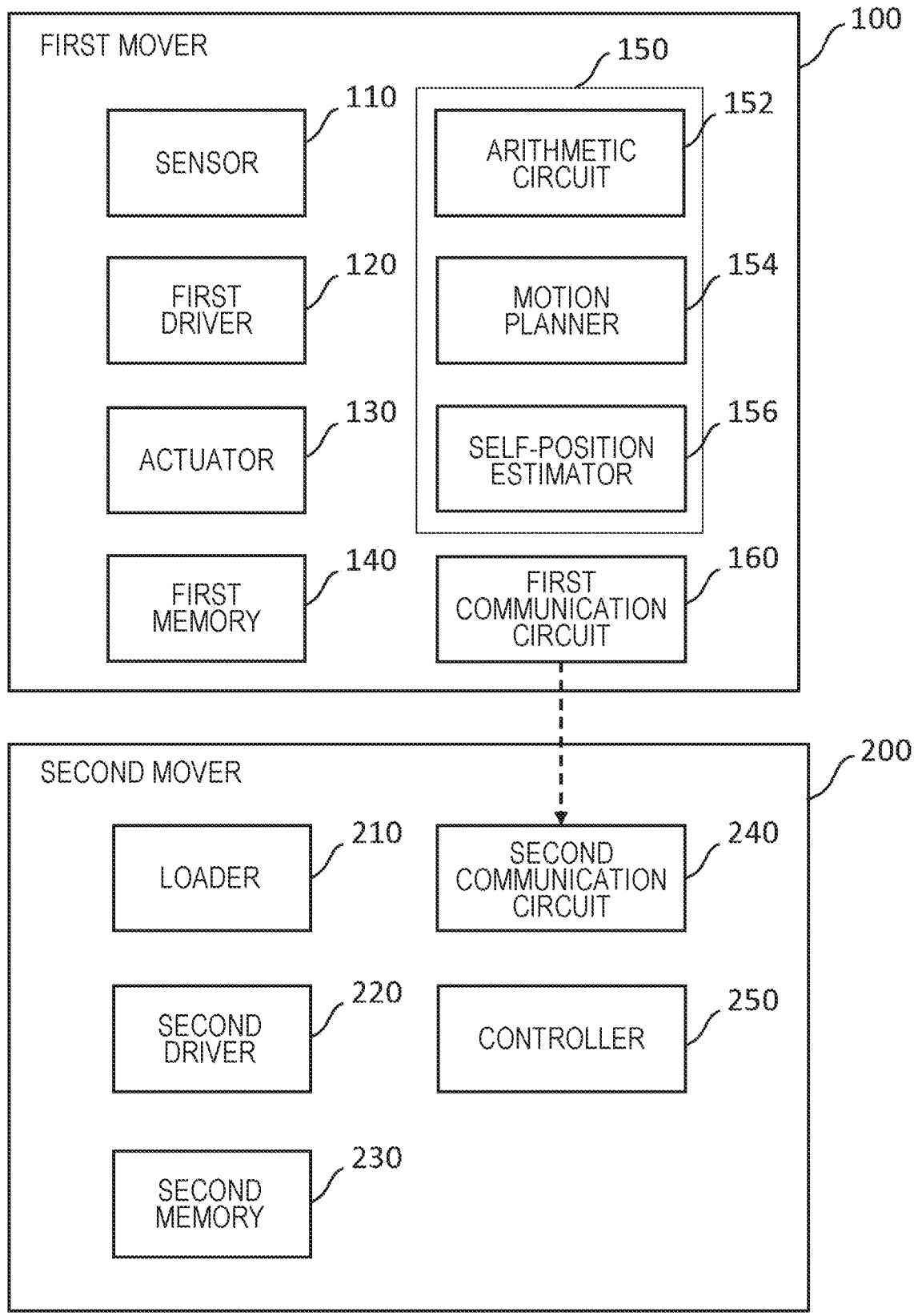
FIG. 2 is a block diagram illustrating a configuration example of a first mover and a second mover.

FIG. 2 is a block diagram illustrating the configuration of the first mover 100 and the second mover 200. The first mover 100 includes a sensor 110, a first driver 120, an actuator 130, a first memory 140, a processor 150, and a first communication circuit 160. The processor 150 includes an arithmetic circuit 152, a motion planner 154, and a self-position estimator 156. The second mover 200 includes a loader 210, a second driver 220, a second memory 230, a second communication circuit 240, and a controller 250.

The sensor 110 is a range sensor, such as a light detection and ranging (LiDAR) sensor. The sensor 110 includes, for example, a light source that emits laser light, a light detector, and a processor. The sensor 110 emits laser light from the light source and detects, with the light detector, laser light reflected from an object within a measurement target region (hereinafter referred to as a measurement region). The processor measures a range and angle from the sensor 110 to each reflection point on the object in accordance with information on the direction of laser light emission and a signal output from the light detector. The light source may emit from the sensor 110 a diffuse light beam that spreads radially in a sector as illustrated in FIG. 1, may emit a light beam, scanning along one-dimensional line, or may emit a flash light beam, radiated on one point. The light beam scanning along one-dimensional line or the flash light beam radiated on one point may be designed to scan one-dimensionally or two-dimensionally such that the range and angle to each reflection point on the object within the measurement region are measured. For example, the sensor 110 may repeat the scan operation once a second to 20 times a second. During one scan, several hundred thousand pulses of laser light may be emitted with the direction of emission changed and the range to each reflection point may thus be measured. The sensor 110 outputs the position of each reflection point in data represented in polar coordinates with the position of the light emission point of the sensor 110 as the origin. The sensor 110 outputs, as the sensor data, position data on each reflection point measured for a specific measurement period (for example, from several milliseconds to several seconds). For example, the position data on each reflection point may include data on range r, polar angle θ and azimuth φ.

The first driver 120 drives the first mover 100. The first driver 120 includes multiple electric motors that perform forward movement, backward movement, and rotation movement, and a control circuit that controls the motors.

The actuator 130 varies the height and/or angle of the sensor 110. The actuator 130 may include one or more electric motors. In response to the state of the load indicated by the sensor data output from the sensor 110, the actuator 130 varies the height and/or angle of the sensor 110. According to the first embodiment, the sensor 110 is not fixed at a constant height and the position of the emission of the laser light may be varied in the direction of height and the emission direction of the laser light may be tilted up or down or trained clockwise or counterclockwise. In this way, the blind spot of the sensor 110 may thus be reduced. For example, by emitting the laser light from a higher position, more position information on another object hidden behind one object may be acquired. By varying the height of the sensor 110, information acquired through laser light reflected in response to laser light emitted from multiple height positions may thus be integrated and the position of the object may be identified more in detail.

The first mover 100 may perform measurements not only at a single location but also at multiple other locations and integrate acquired information, thereby identifying the position of the object more in detail. In such a case, the first mover 100 stores the direction and range along which the first mover 100 has moved and reflects the direction and range on measurement data.

The first memory 140 includes any recording medium, such as a semiconductor memory, a magnetic recording device, or an optical recording device. The first memory 140 stores a computer program executed by the processor 150, data used by the processor 150 in the flow of each process, and data generated by the processor 150 in the flow of each process.

FIGS. 3A and 3B illustrate an example of data stored on the first memory 140. The first memory 140 stores information on the second mover 200 and information on the load shelf 300. Referring to FIG. 3A, the information on the second mover 200 includes, for example, identification (ID) number of the second mover 200, data indicating the size of the second mover 200, such as an overall width, an overall depth, and an overall height of the second mover 200, and data indicating a transport capacity of the fork 212, such as a length and width of the fork 212. Referring to FIG. 3B, the information on the load shelf 300 includes data indicating the shape of the shelf, such as a shelf ID, a width, a depth, and a height of the load shelf 300. These pieces of data are used when the motion planner 154 makes the motion plan as described below. The first memory 140 also stores data on a range and angle to each reflection point generated by the sensor 110 and data indicating the motion plan made by the motion planner 154. The first memory 140 also stores map data on an environment in which the first mover 100 moves.

The arithmetic circuit 152 performs an arithmetic operation to transform polar data (r, θ, φ) on each reflection point output from the sensor 110 into data (x, y, z) in the rectangular coordinate system fixed to the sensor 110. In the following discussion, the sensor data after transformation may be sometimes referred to as three-dimensional point group data. The coordinate transformation may be carried out by a processor in the sensor 110.

The motion planner 154 makes the motion plan of the second mover 200 in response to the sensor data transformed by the arithmetic circuit 152 and the information stored beforehand on the first memory 140. When the motion plan is made, the motion planner 154 digitizes a sequence of operation and an amount of movement of the second mover 200 into specific data. The digitization is performed using basic data (see FIG. 3B) that is stored on the first memory 140 and related to the object, such as the shelf present within the measurement region, and using the predetermined operation sequence of the load transport of the second mover 200.

The self-position estimator 156 estimates the position and orientation of the first mover 100. The self-position estimator 156 may be implemented by a micro-controller unit (MCU) including a processor. The self-position estimator 156 estimates the position and orientation of the first mover 100 using a simultaneous localization mapping (SLAM) technique. Specifically, the self-position estimator 156 estimates the position and orientation of the first mover 100 by matching map data stored beforehand on the first memory 140 with the sensor data transformed by the arithmetic circuit 152. The map data may be two-dimensional point group data. The self-position estimator 156 projects three-dimensional point group data output from the arithmetic circuit 152 onto a plane where the first mover 100 moves in order to convert the three-dimensional point group data into two-dimensional point group data. The self-position estimator 156 then matches the sensor data with the map data. The matching operation may use algorithms, such as iterative closest point (ICP) or normal distribution transform (NDT). The self-position estimator 156 stores the data indicating the position and orientation of the first mover 100 onto the first memory 140. The data is also transmitted to the first driver 120 and thus is used in movement control of the first mover 100.

The arithmetic circuit 152, the motion planner 154, and the self-position estimator 156 may be implemented by a single circuit or a combination of multiple circuits. According to the first embodiment, these are collectively referred to as the processor 150.

The first communication circuit 160 communicates with the second mover 200. The first communication circuit 160 may perform radio communications complying with any radio communication standards, such as Bluetooth (registered trademark) or Wi-Fi (registered trademark). The first communication circuit 160 may also communicate with an apparatus other than the second mover 200. For example, if the first mover 100 operates in response to a command from an external central control apparatus, the first communication circuit 160 also communicates with the external central control apparatus. In such a case, the first communication circuit 160 may receive, from the central control apparatus, a command related to the load transport and may transmit, to the central control apparatus, data indicating the motion plan of the second mover 200 or data indicating the state of the load transport.

Elements of the second mover 200 are described below.

The loader 210 loads and transfers a load. As illustrated in FIG. 1, the loader 210 of the first exemplary embodiment includes the fork 212 and the lift that raises and lowers the fork 212. The lift may include a chain that raises and lowers the fork 212 and a motor that winds up or down the chain. In this way, the loader 210 includes a mechanism that performs a series of operations including raising the fork to the apertures of the pallet 310 on which the load 320 is placed, inserting the fork into the apertures, raising the pallet 310, and then moving the pallet 310 to a predetermined location.

The second driver 220 drives the second mover 200. The second driver 220, like the first driver 120, includes multiple electric motors that perform forward movement, backward movement, change of direction movement of the second mover 200, and a control circuit that controls the electric motors.

The second memory 230 includes any recording medium, such as a semiconductor memory, a magnetic recording device, or an optical recording device. The second memory 230 stores a computer program executed by the controller 250, data used by the controller 250 in the flow of each process, and data generated by the controller 250 in the flow of each process. The second memory 230 temporarily stores data indicating the motion plan and transmitted from the first mover 100.

The second communication circuit 240 receives data from the first communication circuit 160 in the first mover 100. The second communication circuit 240 may perform radio communications complying with any radio communication standards, such as Bluetooth (registered trademark) or Wi-Fi (registered trademark). The second communication circuit 240 may also communicate with an apparatus other than the first mover 100. For example, if the second mover 200 operates in response to a command not only from the first mover 100 but also from an external central control apparatus, the second communication circuit 240 also communicates with the external central control apparatus.

The controller 250 is a control circuit that controls the operation of the loader 210 and the second driver 220. The controller 250 may be implemented by a circuit, such as an MCU, including a processor. The controller 250 converts the data on the received motion plan into a control command for the loader 210 and the second driver 220 and then transmits the control command to each of the loader 210 and the second driver 220. In this way, the controller 250 causes the loader 210 and the second driver 220 to perform the series of operations responsive to the motion plan.

The ranging operation of the first embodiment is described below with reference to FIG. 4.

Figure 4:
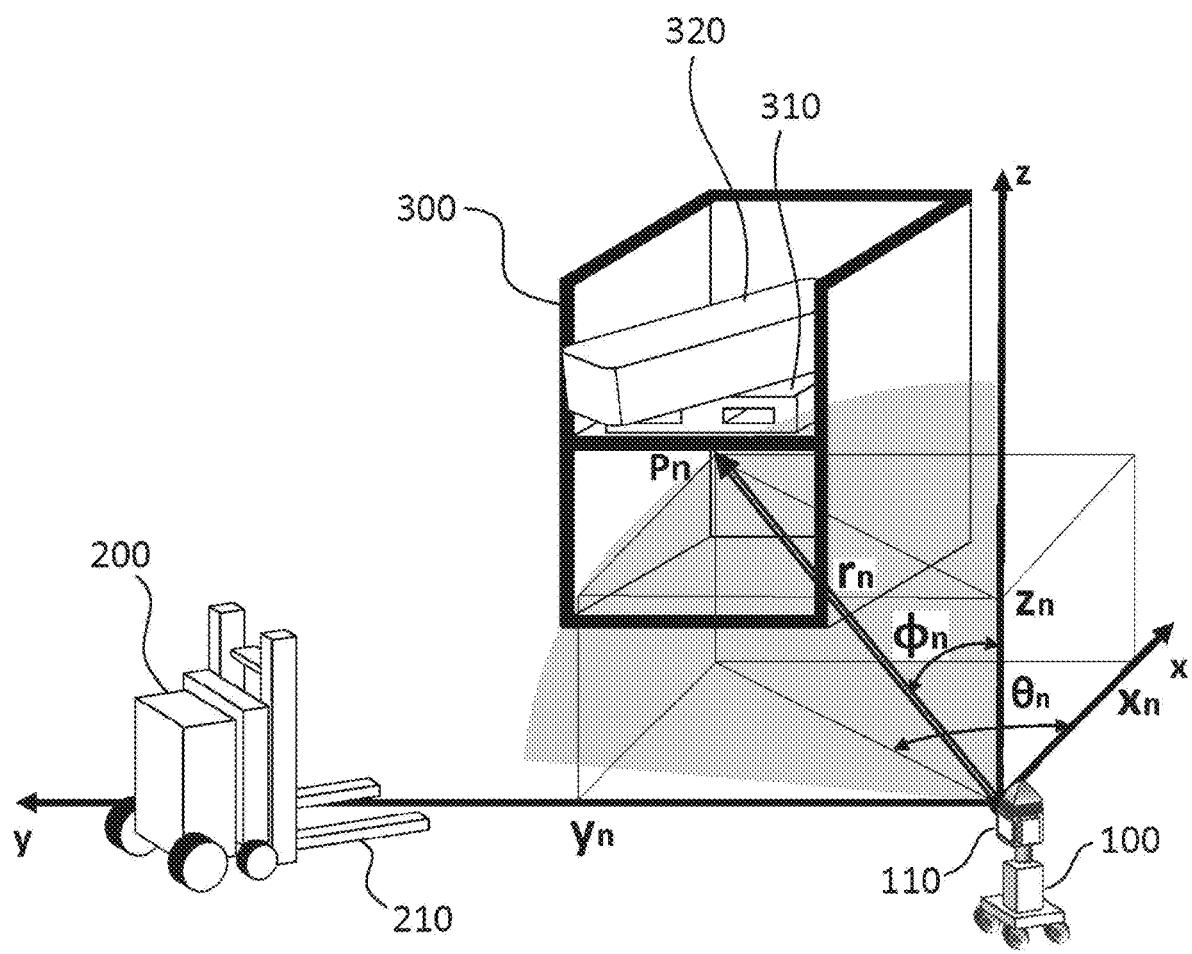
FIG. 4 illustrates a ranging operation performed by the first mover.

FIG. 4 illustrates the ranging operation of the first mover 100. FIG. 4 illustrates a three-dimensional rectangular coordinate system fixed to the sensor 110 in the first mover 100. The rectangular coordinate system has the origin at the position of the light source of the sensor 110 and is defined by mutually rectangular x axis, y axis, and z axis. In an environment where the first mover 100 and the second mover 200 move, the x axis and the y axis are set in a plane parallel to the ground, and the z axis is set to be perpendicular to the plane. With reference to the front direction of the sensor 110, the direction tilted by 45 degrees to the right is the positive direction of the x axis, the direction tilted by 45 degrees to the left is the positive direction of the y axis, and the vertically upward direction is the positive direction of the z axis. In this example, for simplicity of explanation, the x axis is in parallel with the depth direction of the load shelf 300, the y axis is in parallel with the width direction of the load shelf 300, and the z axis is in parallel with the height direction of the load shelf 300.

Referring to FIG. 4, the sensor 110 in the first mover 100 two-dimensionally scans the measurement region by emitting a spot-like laser light beam to the measurement region from a laser light source mounted inside the sensor 110. The laser light beam emitted from the laser light source is not limited to the spot-like laser light beam and may be a laser light beam that one-dimensionally scans along a line or a laser light beam that radially spreads in a sector. The measurement region is a region that is measurable by the sensor 110 and schematically represented in a sector shape in FIG. 4. The measurement region thus includes the second mover 200, the pallet 310 placed on the load shelf 300, and the load 320 on the pallet 310. The sensor 110 receives light reflected from an object present within the measurement region. The processor in the sensor 110 measures a range rn to the object by measuring time when the laser light is emitted to when the reflected light is received. The emitted laser light returns to a light detector after traveling twice the range rn to the object. The processor in the sensor 110 may thus record the time of laser light emission and the time of the laser light reception and determine the range rn by multiplying half the time difference by the speed of light.

Figure 5:
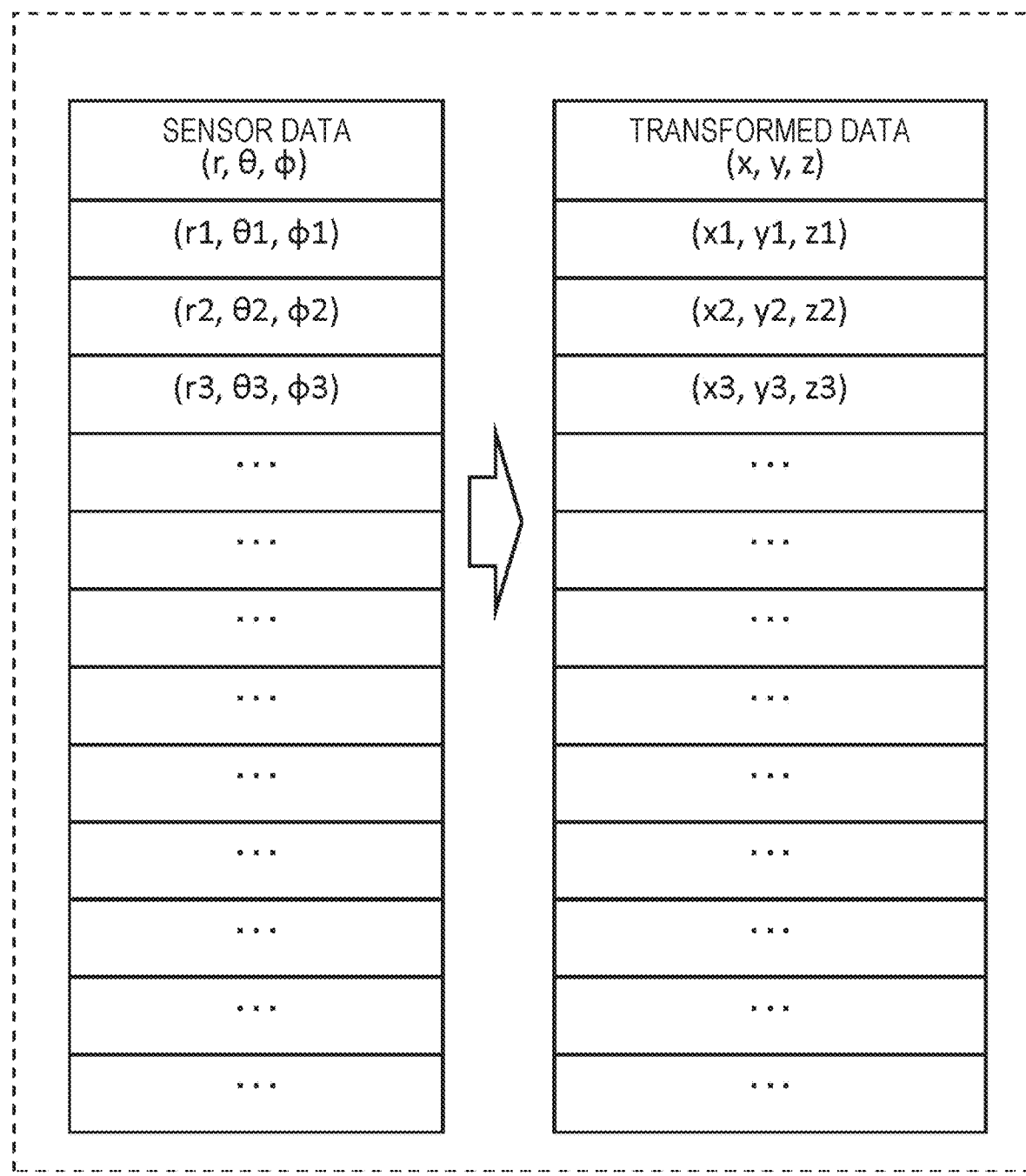
FIG. 5 illustrates an example of coordinate transformation of sensor data.

Pn represents an n-th reflection point within the measurement region, rn represents the range from the light source of the sensor 110 to the point Pn, $\phi n$ represents an angle made by the direction of the laser light emitted from the light source to the point Pn and the z axis, and θn represents an angle made by the x axis and the direction that is obtained by projecting onto the xy plane the direction of the laser light emitted from the light source to the point Pn. The sensor 110 generates and outputs the sensor data that represents the position of each of the points measured during a predetermined length of measurement period. As represented in a left-hand side table in FIG. 5, the sensor data may be a combination of a range r to each point and two angles θ and φ. The arithmetic circuit 152 in the processor 150 transforms the sensor data on each point into position data represented in the rectangular coordinate system as illustrated in a right-hand table in FIG. 5.

Transformation from polar coordinates (rn, φn, θn) to rectangular coordinates (xn, yn, zn) is represented as follows:

$$xn = rn \times \sin \phi n \times \cos \theta n,$$

$$yn = rn \times \sin \phi n \times \sin \theta n,$$

$$zn = rn \times \cos \phi n.$$

In accordance with these equations, the arithmetic circuit 152 transforms the polar coordinates of each point into rectangular coordinates.

In the position data on each point transformed by the arithmetic circuit 152, two coordinates of the three coordinates, namely, (x, y), (y, z) or (x, z) that are equal to each other may be detected as multiple consecutive points. The motion planner 154 determines a group of such consecutive points to be points that form a surface or a ridgeline of an object and then records information on the determined group on the first memory 140.

FIG. 6 illustrates an example of multiple points forming the determined group. Referring to FIG. 6, multiple points consecutive in the x direction having common values of y and z coordinates (y0, z0) are recorded as a group A, and multiple points consecutive in the z direction having common values of x and y coordinates (x0, y1) are recorded as a group B. These groups are considered points lined in a straight line forming the surface or ridgeline of an object within the measurement region. The motion planner 154 checks data on these groups against data (see FIG. 3A) related to the shape of the second mover 200 and data (see FIG. 3B) related to the shape of the load shelf 300, recorded on the first memory 140. The motion planner 154 may thus identify the positions of the second mover 200 and the load shelf 300.

Figure 7:
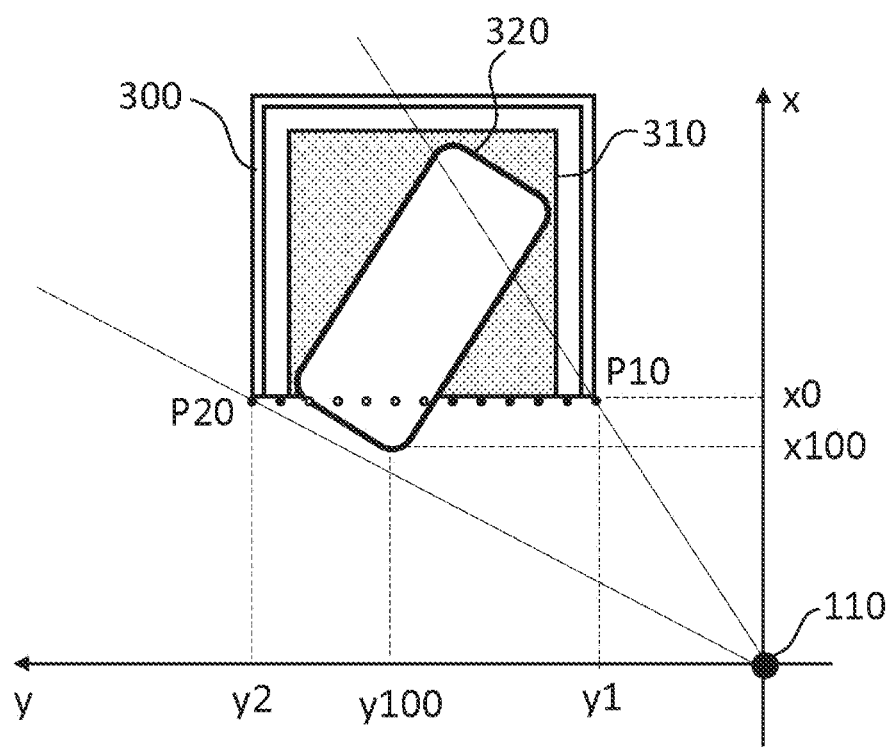
FIG. 7 is a plan view schematically illustrating how the load shelf, a pallet, and a load are irradiated with light from a sensor.
Figure 8:
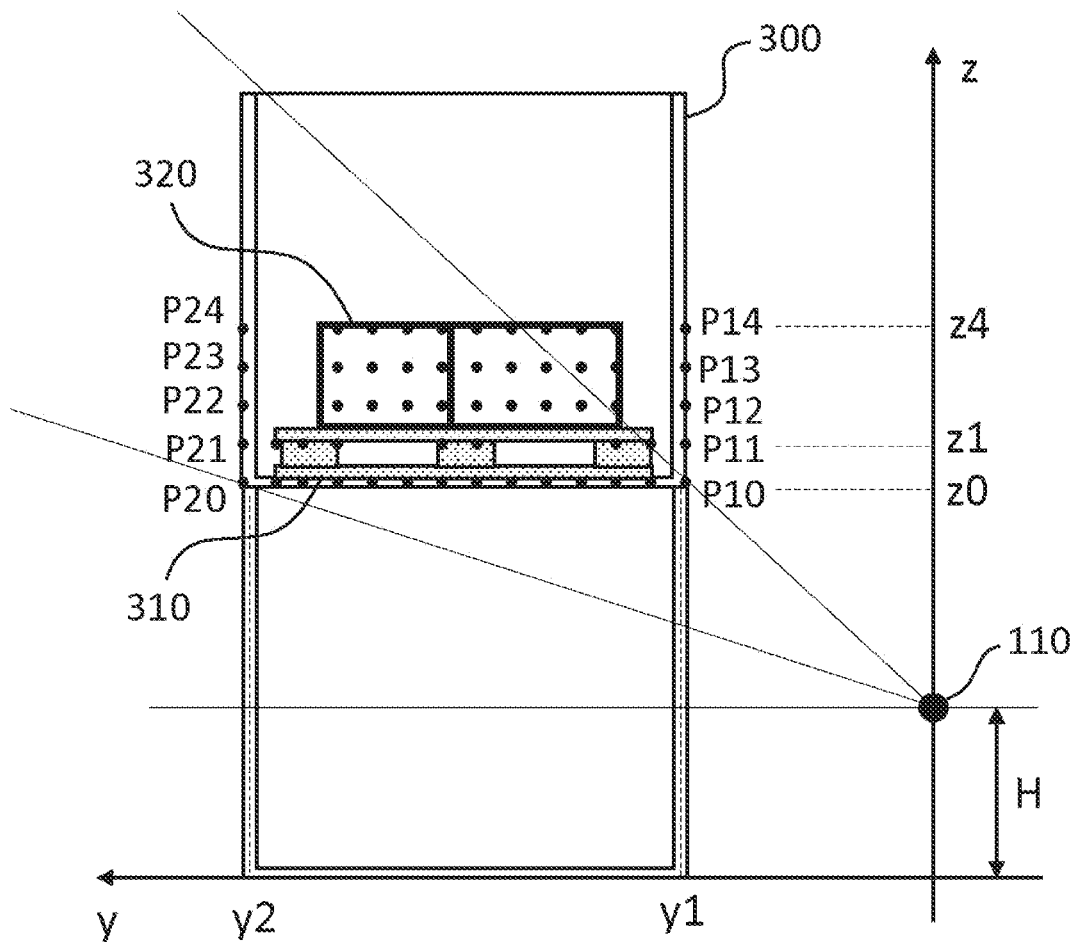
FIG. 8 is a front view schematically illustrating how the load shelf, the pallet, and the load are irradiated with light from the sensor.

A specific example of a method of identifying the position of the load is described below with reference to FIGS. 7 and 8. FIGS. 7 and 8 are respectively a plan view and a front view that schematically illustrate how the load shelf 300, the pallet 310, and the load 320 are irradiated with light emitted by the sensor 110. If the laser light is emitted onto an area encircling the load 320 as illustrated in FIGS. 7 and 8, points P20 through P10, each having z0 as a z coordinate, are consecutively arranged along the underside of the load shelf 300 on which the pallet 310 having the load 320 placed thereon is placed. Since no light is reflected from both sides of the load shelf 300, it is considered that there is no object. If measurement is continuously performed with the emission position changed in the z direction, the pallet 310 is partially detected as light reflected from points P21 through P11 as illustrated in FIG. 8 but no reflected light is detected from an area where there is no object. If the emission position is changed, the load 320 is partially identified as consecutive points of group between the point P22 to P14 on the load 320.

Based on the position information on the object within the identified measurement region, the motion planner 154 makes the motion plan that allows the second mover 200 to load the load 320 and transfers the load 320 to a particular location.

FIG. 9 illustrates an example of the motion plan. As illustrated in FIG. 9, the motion plan includes information used to provide instructions to cause the second mover 200 to perform a series of operations. The series of operations include counterclockwise rotation, clockwise rotation, and ±x direction movement, ±y direction movement of the second mover 200 and ±z direction movement of the fork 212. The motion plan includes information on an angle of the rotation and an amount of movement in each direction. In accordance with the motion plan, the second mover 200 moves, thereby performing an operation of loading the load 320 placed on the load shelf 300.

Figure 10:
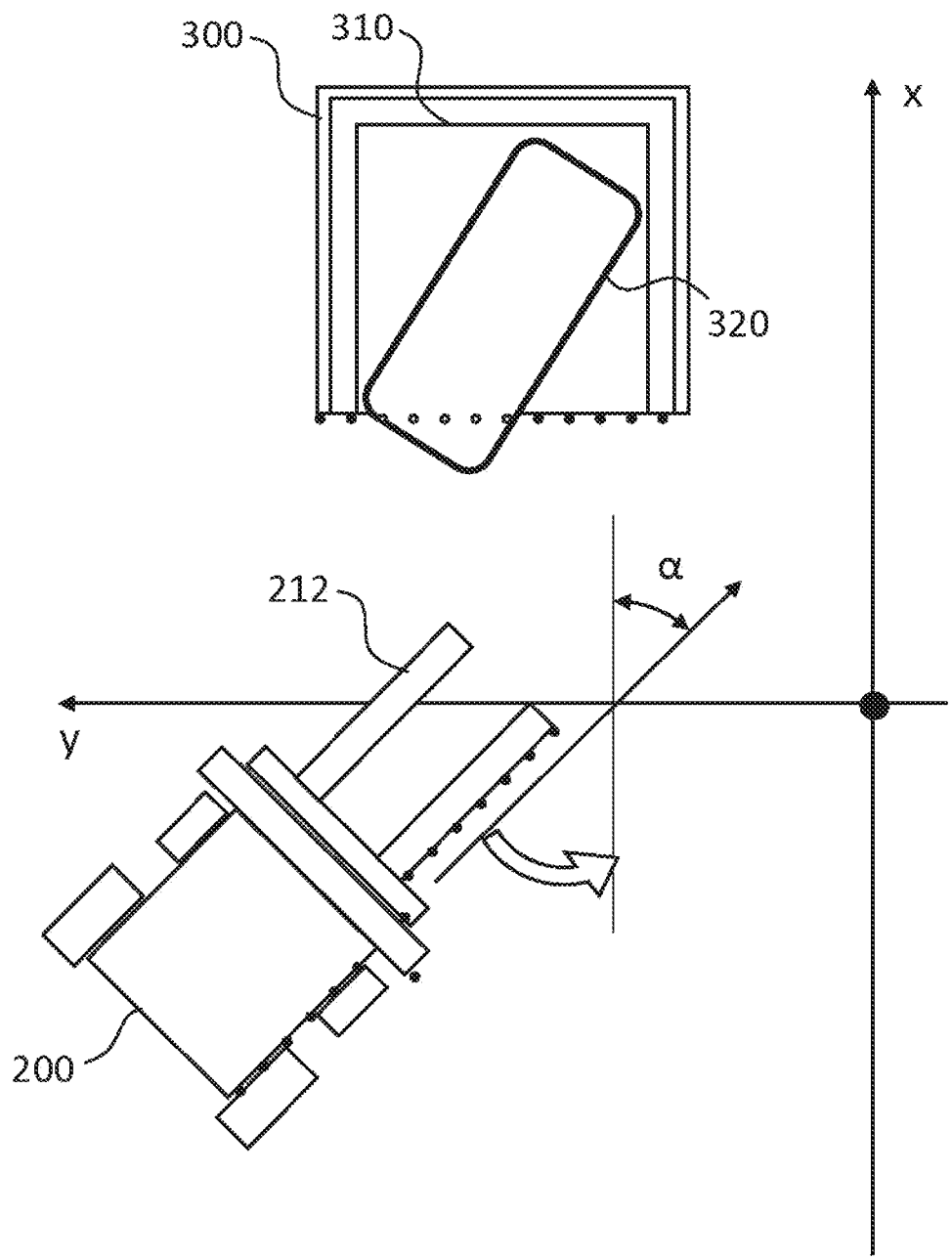
FIG. 10 is a plan view illustrating a positional relationship of the second mover and the load before the motion plan is made.

FIG. 10 is a plan view illustrating a positional relationship of the second mover 200 with the load 320 before the motion plan is made. To perform the loading operation, the second mover 200 is to face the load shelf 300, namely, the fork 212 of the second mover 200 is to be perpendicular to the front of the load shelf 300. The fork 212 is to be placed in a position that enables the fork 212 to be inserted into the apertures of the pallet 310. Referring to FIG. 10, in response to the position information on the identified second mover 200 and load shelf 300, the motion planner 154 identifies an angle α made between the direction of the extension of the fork 212 of the second mover 200 and the direction perpendicular to the front surface of the load shelf 300. The motion planner 154 makes the motion plan such that the angle α is 0. In response to the motion plan, the second driver 220 in the second mover 200 adjusts an angle of a steering wheel of the second mover 200 to perform a counterclockwise rotation of the angle α.

Referring to FIG. 9, the direction correction and loading operation of the second mover 200 are performed in a single motion plan, but alternatively, the direction correction and loading operation may be arranged as different motion planes. For example, the motion planner 154 makes a motion plan for the direction correction of the second mover 200, the sensor 110 performs a measurement operation after the direction is corrected, and then the motion planner 154 makes a motion plan for the loading operation in response to the measurement results. If the position of the apertures of the pallet 310 of the load shelf 300 is displaced from the position of the fork 212 in the y direction after the direction correction is performed, the motion planner 154 may make a motion plan to move the second mover 200 further in the y direction and the motion plan is then executed. In this case, after the direction correction of the second mover 200 is performed, the sensor 110 performs the measurement operation and then the motion planner 154 may make a motion plan to correct the position of the second mover 200 in the y direction in response to the measurement results.

Figure 11:
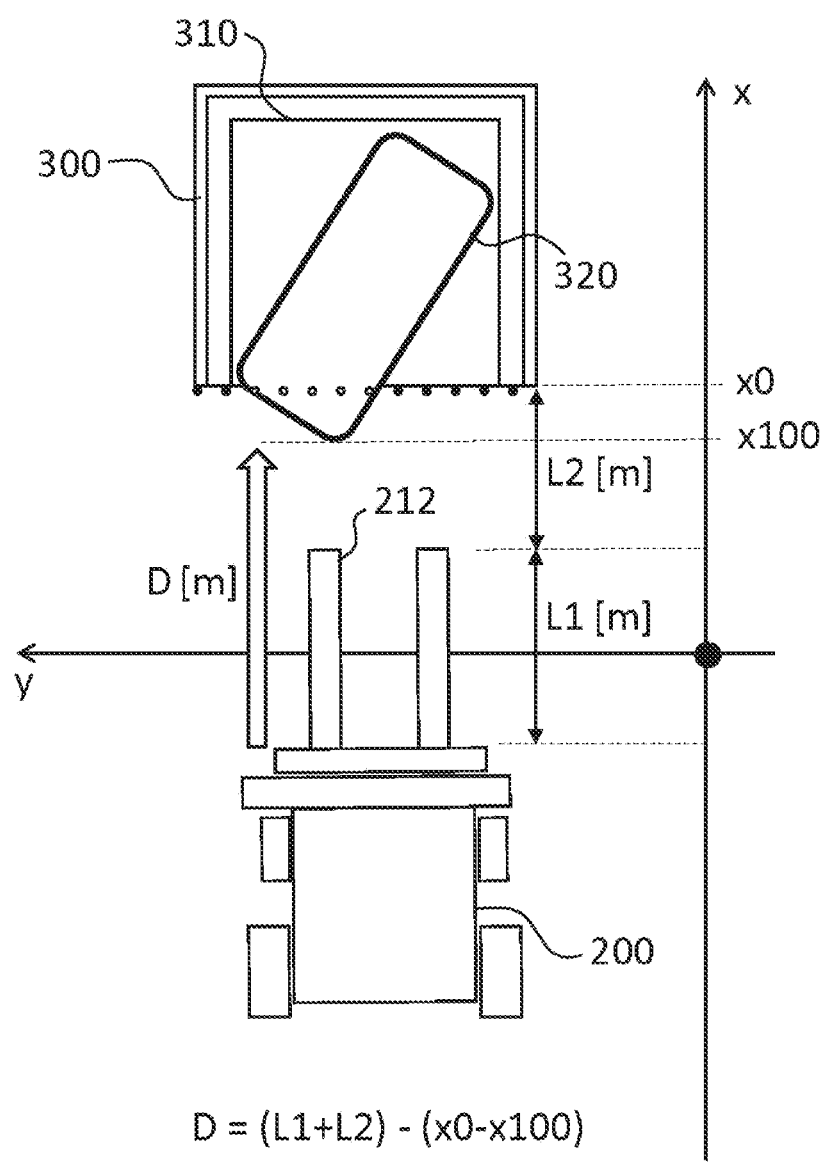
FIG. 11 is a plan view illustrating a positional relationship of the second mover and the load after direction correction is performed.

FIG. 11 is a plan view illustrating the positional relationship of the second mover 200 with the load 320 after the direction correction is performed such that the fork 212 is perpendicular to the front of the load shelf 300. In this example, the load 320 protrudes forward from the load shelf 300 in a forward direction, namely, the −x direction. L1 represents the length of the fork 212, L2 represents the length from the forward end of the fork 212 to the front of the load shelf 300, x0 represents an x coordinate of the front of the load shelf 300, and x100 represents an x coordinate of the forward-most portion of the load 320 in the −x direction. In this case, the second mover 200 has difficulty moving forward by L1+L2 to the front of the load shelf 300 in the loading operation. To control the collision with the load 320, the second mover 200 is permitted to move forward to the load 320 by an amount of movement D determined by the following equation:

$$D = (L1 + L2) - (x0 - x100).$$

If the load 320 protrudes from the load shelf 300 in this way, a sensor may be secured between teeth of the forks 212 of the second mover 200 to recognize only insertion points for the forks 212. In this method, however, the second mover 200 may possibly be in contact with the load 320. If multiple sensors are mounted on each of the second movers 200, increases in cost and size may result.

According to the first embodiment, the motion planner 154 detects a protrusion of the load 320 from the pallet 310 toward the second mover 200 in response to the sensor data. In response to the detection of the protrusion of the load 320, the motion planner 154 makes the motion plan. In the motion plan, the motion planner 154 causes the second mover 200 to stop advancing before the second mover 200 collides with the load 320 in the operation of the second mover 200 that moves forward to insert the fork 212 into the apertures of the pallet 310. Specifically, the motion planner 154 makes the motion plan in a manner such that L1, L2, x0, and x100 in FIG. 11 are identified in response to the sensor data and the second mover 200 is caused to move in the x direction by an amount of movement smaller than D=(L1+L2)−(x0−x100). This motion may preclude the second mover 200 from touching the load 320 and the load 320 or the second mover 200 from being damaged.

A specific example of data transmission between the first mover 100 and the second mover 200 is described below.

Figure 12:
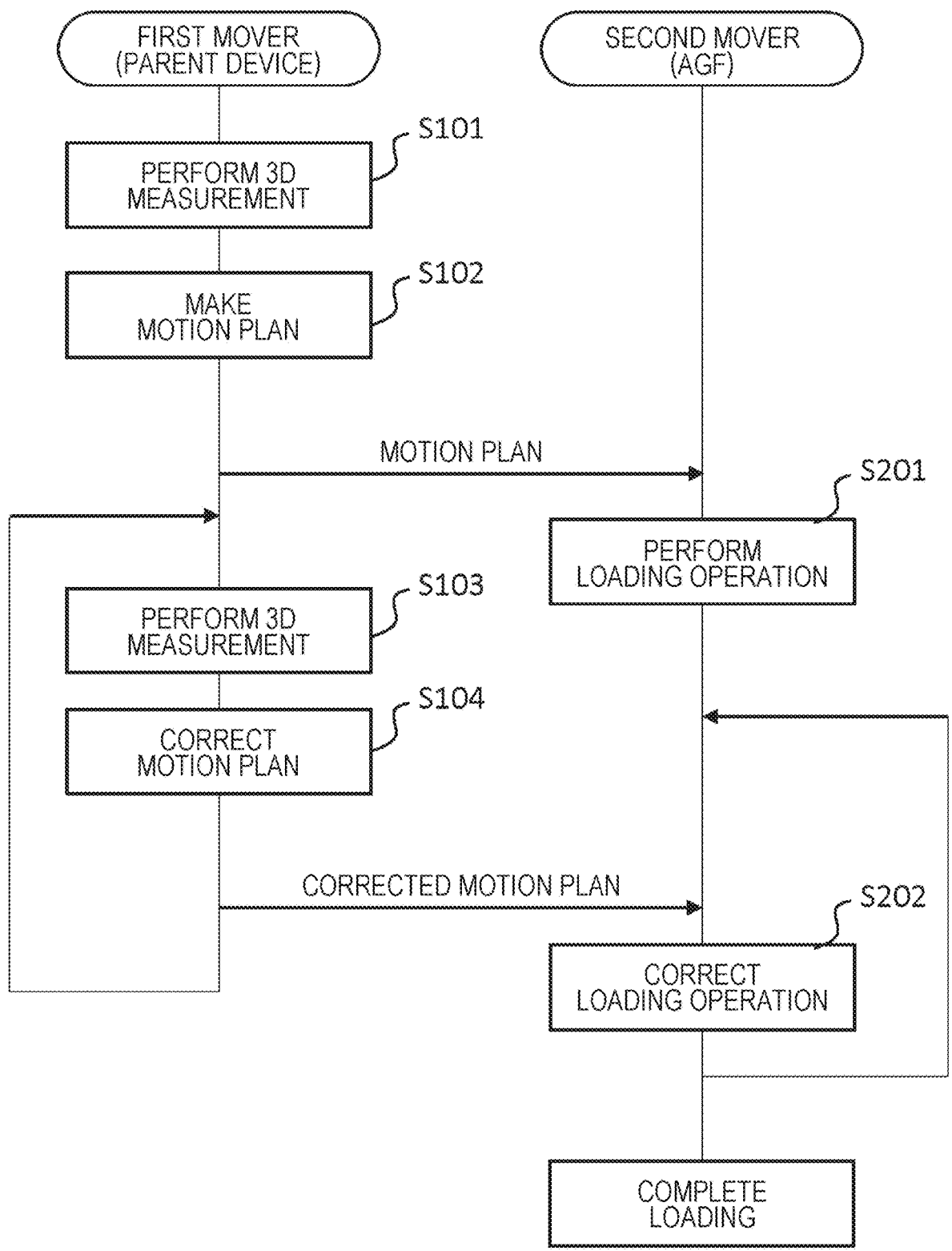
FIG. 12 is a sequence diagram of an example of data transmission between the first mover and the second mover.

FIG. 12 is a sequence diagram of an example of the data transmission between the first mover 100 and the second mover 200 serving as the AGF. In this example, using the sensor 110 emitting the laser light, the first mover 100 performs three-dimensional (3D) measurement on the second mover 200 that perform transportation and the load 320 that is to be transported (S101). In accordance with the position information on the second mover 200 and the load 320 obtained through the 3D measurement, the motion planner 154 in the first mover 100 makes the motion plan for the load transportation (S102). The motion planner 154 transmits data indicating the made motion plan from the first communication circuit 160 to the second mover 200. The second mover 200 performs the loading operation in response to the received motion plan data (S201). The first mover 100 having made the motion plan makes continuously the 3D measurement with the sensor 110 (S103). If correction is to be performed, the first mover 100 makes a corrected motion plan and transmits data indicating the corrected motion plan (S104). The second mover 200 corrects the loading operation in response to the data indicating the corrected motion plan (S202). The correction of the motion plan in step S104 may be performed if the second mover 200 is displaced in position from an expected position after the second mover 200 performs the direction correction on the load shelf 300. The correction of the motion plan may be performed typically once but may also be performed multiple times. Each time the motion plan is corrected, the second mover 200 corrects the operation thereof. When the second mover 200 finishes the motion indicated by the corrected motion plan, the loading operation ends.

A more specific example of the operation of the first mover 100 is described below.

Figure 13:
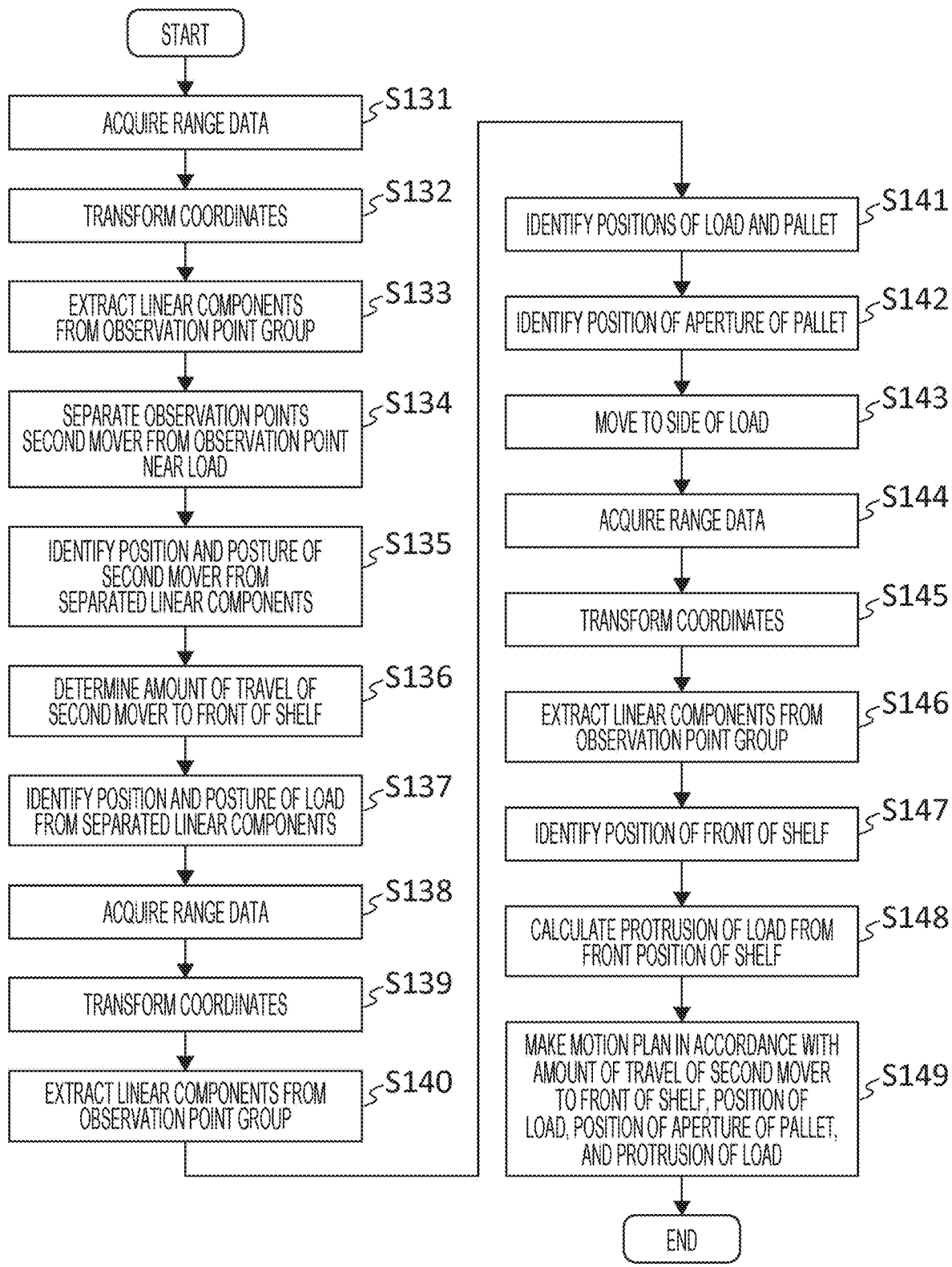
FIG. 13 is a flowchart illustrating a specific example of an operation of the first mover.

FIG. 13 is a flowchart illustrating a specific example of operation of the first mover 100. The first mover 100 is placed together with the second mover 200 in the vicinity of the load 320 that is to be transported. The first mover 100 acquires range data on the object using the sensor 110 (S131). The arithmetic circuit 152 transforms the range data on each point as the sensor data into three-dimensional point group data, in other words, coordinates (x, y, z) in the rectangular coordinate system (S132). The motion planner 154 identifies an object within the measurement region by extracting linear components forming a surface or ridgeline from the observed point group data (S133). The motion planner 154 separates the data on observation points of the second mover 200 from data on observation points surrounding the load shelf 300. The data separation is performed in response to the extracted linear components and data on one or more second movers 200 and the load shelf 300 stored beforehand on the first memory 140 (S134).

The motion planner 154 identifies the position and posture of the second mover 200 in response to data on the separated linear components indicating the second mover 200 and information on the second mover 200 stored on the first memory 140 (S135). In order to perform the loading operation, the motion planner 154 determines the amount of movement of the second mover 200 in each direction such that the fork 212 is positioned to be perpendicular to the front of the load shelf 300 (S136). The motion planner 154 also identifies the position and posture of the load 320 in response to the separated data on the linear components on the object surrounding the load 320 and information on the load shelf 300 stored on the first memory 140 (S137). In order to identify the state of the load more in detail, the first mover 100 performs again measurements on the periphery of the load with the sensor 110 (S138). In the same way as illustrated in step S132, the arithmetic circuit 152 transforms the sensor data into coordinate values (x, y, z) in the rectangular coordinate system (S139). The motion planner 154 extracts linear components from the transformed point group data in the same way as illustrated in step S133 (S140). The motion planner 154 identifies the positions of the load 320 and the pallet 310 in response to the distribution of the extracted linear components (S141). The motion planner 154 further identifies the two apertures of the pallet 310 serving as fork teeth reception points of the pallet 310 (S142). The first mover 100 then moves to a side of the load 320 (S143). The first mover 100 performs again measurements on the side of the load 320 with the sensor 110 (S144). In the same way as illustrated in step S132, the arithmetic circuit 152 transforms the sensor data into coordinate values (x, y, z) in the rectangular coordinate system (S145). The motion planner 154 extracts linear components from the transformed point group data in the same way as in step S133 (S146). The motion planner 154 identifies the front position of the load shelf from the extracted linear components (S147). The motion planner 154 further determines whether the load 320 protrudes from the front position of the load shelf 300 and calculates an amount of protrusion (S148).

The motion planner 154 makes the motion plan in response to the amount of movement determined in step S136, the position of the load 320 identified in step S141, the positions of the apertures of the pallet 310 identified in step S142, and the amount of protrusion of the load 320 calculated in step S148 (S149). The motion planner 154 herein makes the motion plan that causes the second mover 200 to move toward the front of the load 320 such that the fork 212 is inserted into the apertures of the pallet 310. The amount of forward movement is determined based on the amount of protrusion of the load 320 in a manner such that the second mover 200 does not collide with the load 320.

FIG. 13 illustrates an example of the motion, and the process is modifiable as appropriate. For example, steps S135 and S136 may be performed subsequent to steps S137 through S148. The timing of acquiring the range data, the number of acquisitions, and the acquisition method may not be limited to the example described above and may be modified in view of an actual environment.

Figure 14:
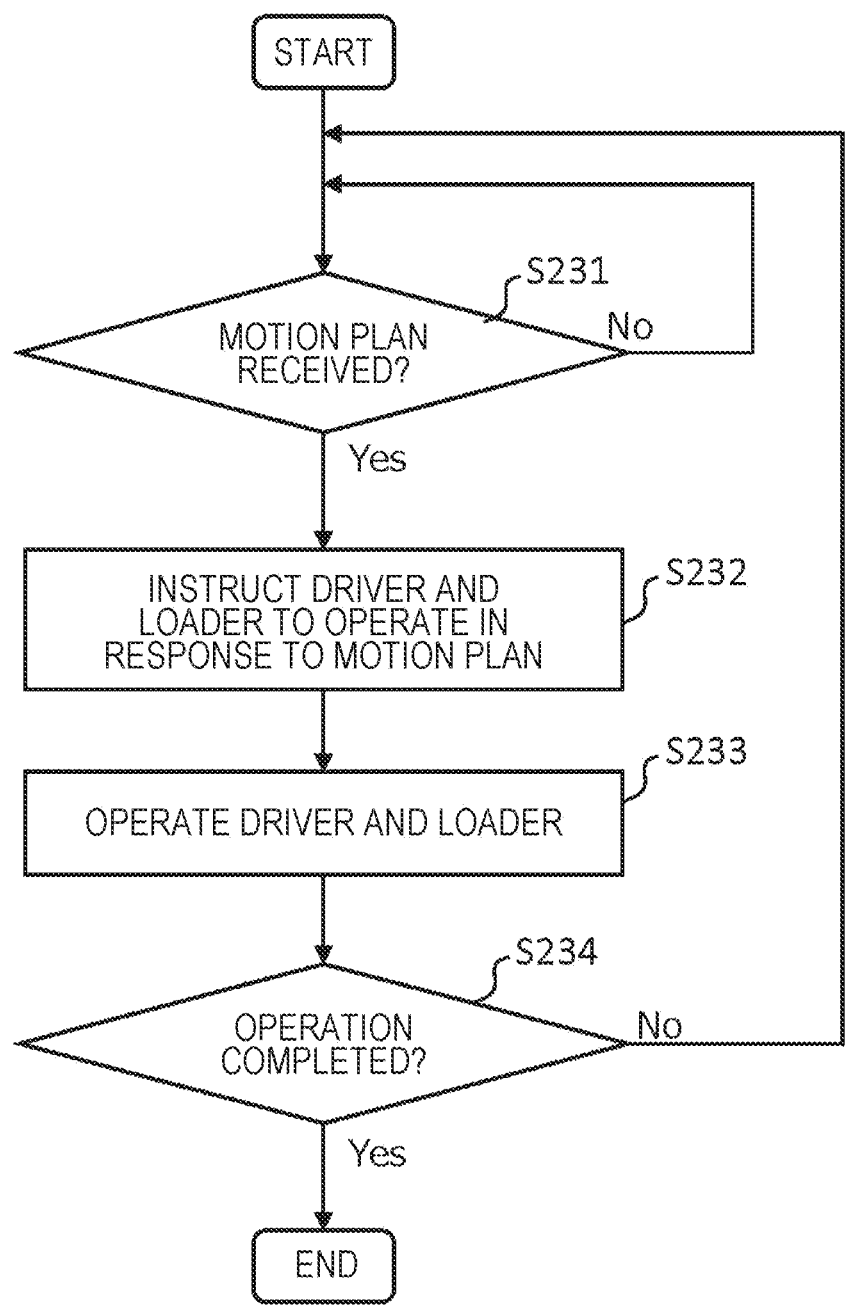
FIG. 14 is a flowchart illustrating an example of a loading operation of the second mover.

FIG. 14 is a flowchart illustrating an example of the loading operation of the second mover 200. In this example, the controller 250 in the second mover 200 determines whether the second communication circuit 240 has received the motion plan from the first mover 100 (S231). If the motion plan has not been received, the controller 250 performs the determination again in step S231 after the elapse of a specific period of time (for example, several milliseconds to serval seconds). If the motion plan has been received, the controller 250 provides an instruction to perform a specific motion to the second driver 220 and the loader 210 in accordance with the motion plan (S232). In response to the instruction from the controller 250, the second driver 220 and the loader 210 perform the operation specified by the instruction (S233). If the motion plan defines only the movement and rotation, only the second driver 220 performs the specified operation while the loader 210 does not perform any particular operation. If the motion plan defines only the loading operation, only the loader 210 performs the specified operation while the second driver 220 does not perform any particular operation. The controller 250 then determines whether the operation is complete (S234). If the operation is not complete, the controller 250 returns to step S231 to perform the operation again. If the operation defined by the motion plan is complete or if an instruction to finish the operation is provided by a user or an external control apparatus, the operation ends.

The load transport system of the first embodiment thus includes one or more first movers 100 and one or more second movers 200 performing the job of transporting the load. The first mover 100 includes the first driver 120 moving the first mover 100, the sensor 110 outputting the sensor data indicating the three-dimensional distribution of the objects surrounding the first mover 100, and the processor 150. The second mover 200 includes the second driver 220 moving the second mover 200 and the loader 210 performing the operation of loading the load. The processor 150 makes the motion plan of the second mover 200 in response to the sensor data and transmits to the second mover 200 the control signal that causes the second driver 220 and/or the loader 210 to operate in accordance with the motion plan. Without mounting expensive measurement device or control device on the second mover 200, the configuration described above may cause the second mover 200 to smoothly perform the loading operation.

According to the first embodiment, the processor 150 makes the motion plan in response to the sensor data that the sensor 110 has output several times. The first driver 120 moves the first mover 100 in response to the relative position of the second mover 200 with reference to the load 320 indicated by the sensor data. After the first mover 100 has moved, the sensor 110 acquires again the sensor data and transmits the sensor data to the processor 150. The processor 150 updates the motion plan in response to the sensor data that has been acquired again. In these operations, the relative position of the second mover 200 with reference to the load 320 may be identified more accurately and the load 320 may be transported without the second mover 200 touching the load 320.

The first mover 100 of the first embodiment further includes the actuator 130 that varies the height and/or the angle of the sensor 110 in response to the shape of the load 320 indicated by the sensor data. In this way, without moving the first mover 100, information on more point groups may be acquired by varying the height and/or the angle of the sensor 110. The positions and postures of the second mover 200 and the load 320 may thus be identified more accurately.

Second Embodiment

Figure 15:
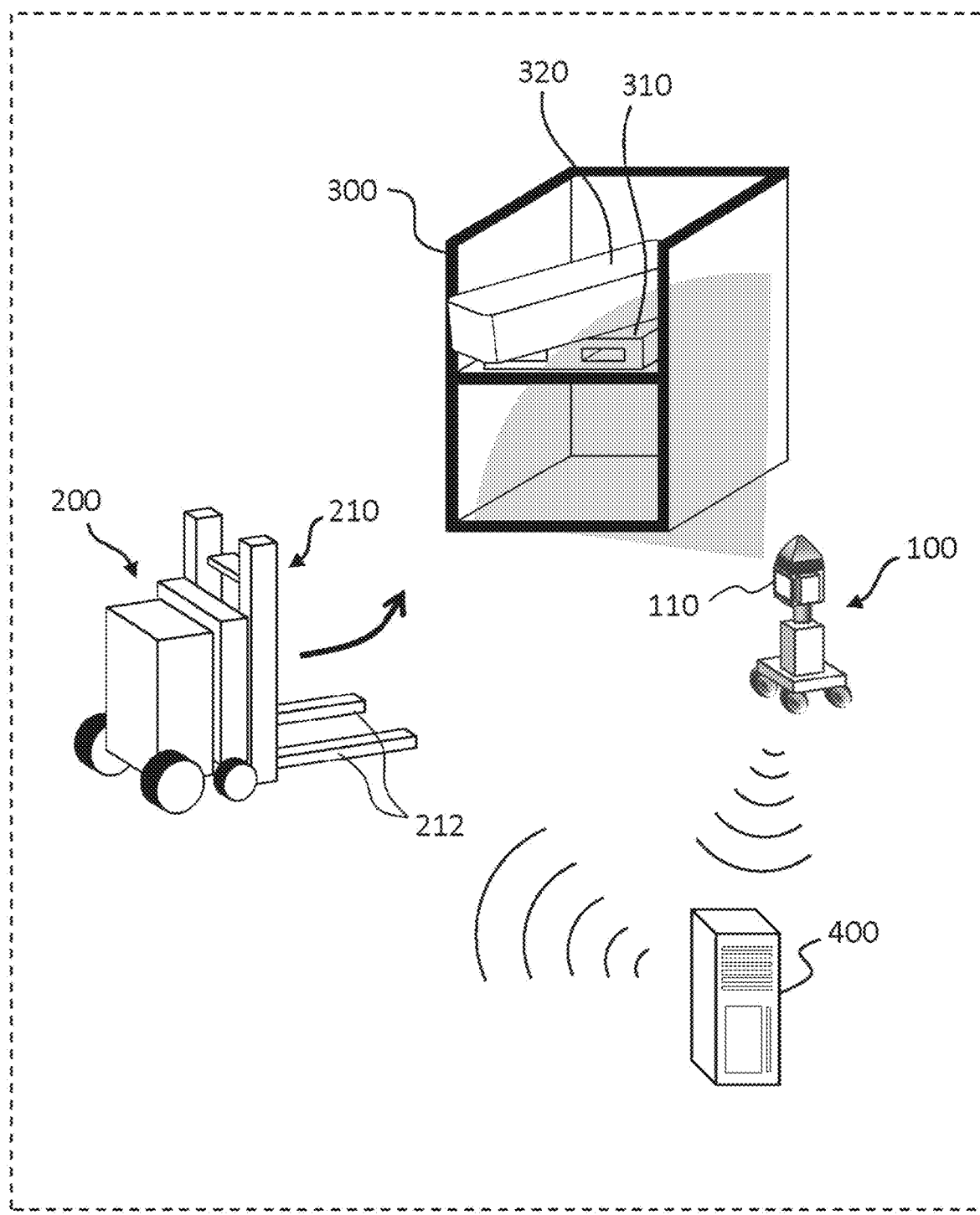
FIG. 15 schematically illustrates an embodiment in which the load transport system further includes a central control apparatus.
Figure 16:
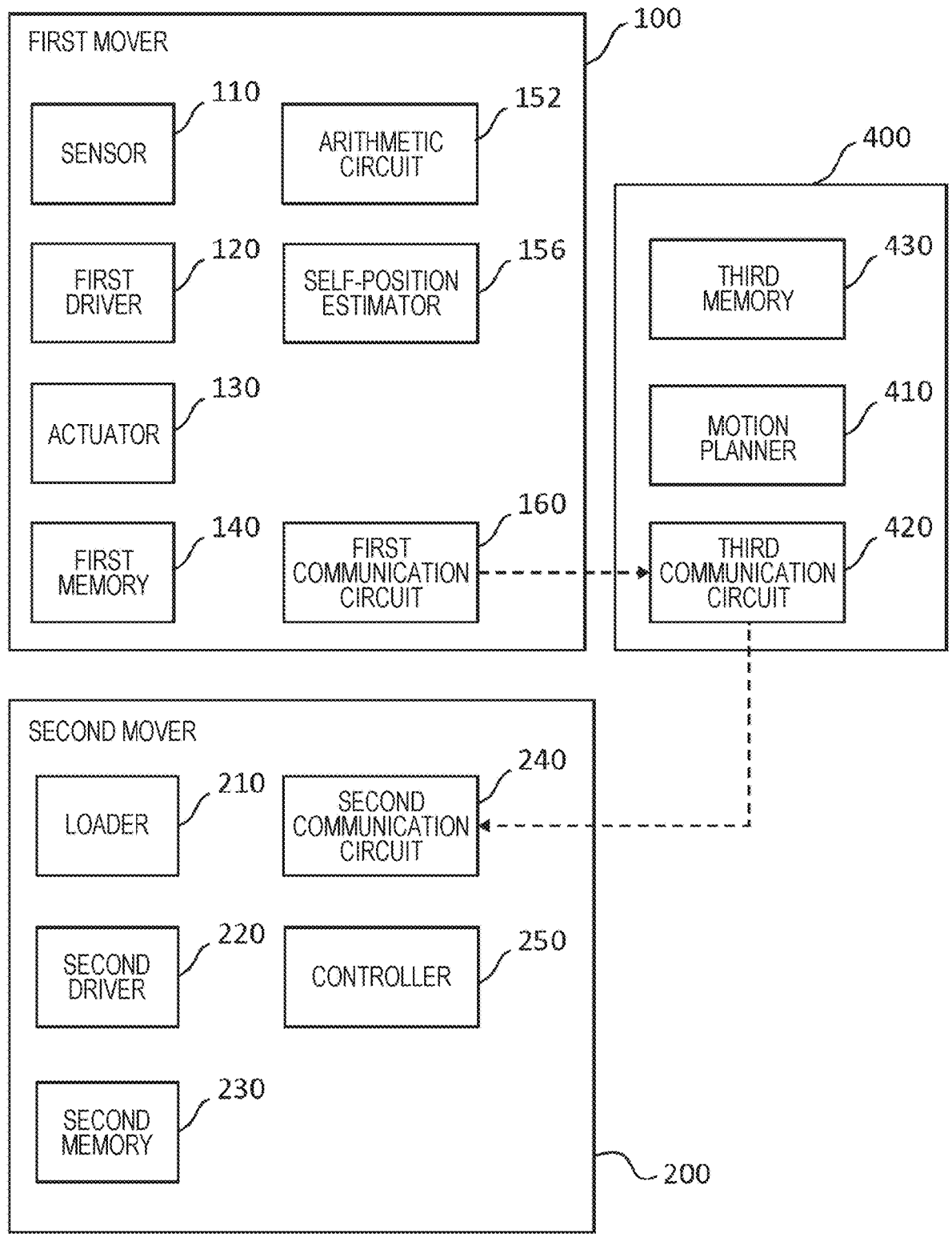
FIG. 16 is a block diagram illustrating a configuration example of the load transport system including the central control apparatus.
Figure 17:
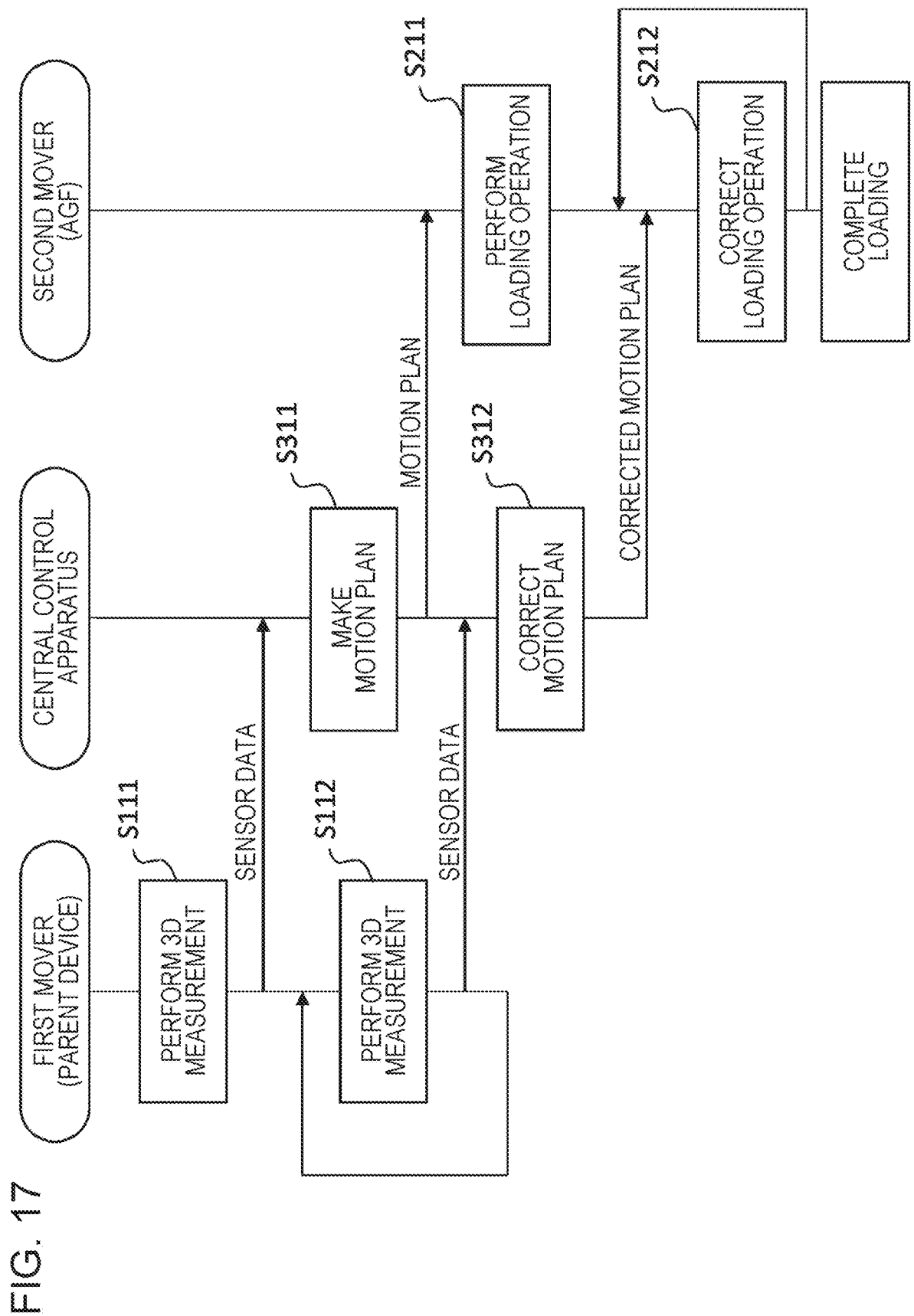
FIG. 17 is a sequence diagram illustrating an example of data transmission between the first mover, the second mover, and the central control apparatus in the system in FIG. 16.

According to the first embodiment, the first mover 100 makes the motion plan of the second mover 200 and then transmits the motion plan to the second mover 200. This operation may be performed by an apparatus other than the first mover 100. For example, the motion plan may be made by a processor arranged in a central control apparatus that manages the load transport operation of the second mover 200. Referring to FIGS. 15 through 17, a second embodiment having such a configuration is described below. In the following discussion, the discussion of elements or operations of the first embodiment is not duplicated.

FIG. 15 schematically illustrates an example of the load transport system including further a central control apparatus 400 in addition to the first mover 100 and the second mover 200. The central control apparatus 400 may be a computer, such as a server, which may be installed at a warehouse or plant where the load transport system is used. The central control apparatus 400 communicates with the first mover 100 and the second mover 200. The motion plan of the second mover 200 is made not by the first mover 100 but by the central control apparatus 400.

FIG. 16 is a block diagram illustrating a configuration example of the load transport system including the central control apparatus 400. In this example, the first mover 100 does not include the motion planner 154 of the first embodiment. Alternatively, the central control apparatus 400 includes a motion planner 410. The motion planner 410 is a processor that has the same function as the motion planner 154. The central control apparatus 400 further includes a third communication circuit 420, communicating with the first communication circuit 160 and the second communication circuit 240, and a third memory 430. The third memory 430 stores beforehand data related to the second mover 200 and the load shelf 300 illustrated in FIGS. 3A and 3B. The third communication circuit 420 receives from the first communication circuit 160 the sensor data generated by the sensor 110. The motion planner 410 identifies the positions of the second mover 200 and the load 320 in response to the sensor data and data related to the second mover 200 and the load shelf 300 stored on the third memory 430, and then makes the motion plan. The motion of the motion plan made by the motion planner 410 is identical to the motion of the motion plan made by the motion planner 154 of the first embodiment. The motion planner 410 transmits the data indicating the made motion plan from the third communication circuit 420 to the second communication circuit 240. The controller 250 in the second mover 200 controls the second driver 220 and the loader 210 in response to the data on the motion plan.

FIG. 17 is a sequence chart illustrating an example of data transmission between the first mover 100, the second mover 200, and the central control apparatus 400 illustrated in the system in FIG. 16. In this example, in order to transport a load, the first mover 100 first performs, using the sensor 110 emitting the laser light, the 3D measurement on the second mover 200 transporting the load and the load 320 to be transported and then transmits the acquired sensor data to the central control apparatus 400 (S111). After transmitting the sensor data, the first mover 100 repeats the 3D measurement with the position and orientation thereof changed (S112). The motion planner 410 in the central control apparatus 400 makes the motion plan of the second mover 200 in response to the transmitted sensor data and then transmits the data indicating the motion plan to the second mover 200 (S311). If the motion planner 410 in the central control apparatus 400 receives again the sensor data from the first mover 100 after transmitting the motion plan, the motion planner 410 corrects the motion plan as appropriate and then transmits data on the corrected motion plan to the second mover 200 (S312). The second mover 200 performs the loading operation in response to the data on the motion plan transmitted from the central control apparatus 400 (S211). Upon receiving the corrected motion plan before the completion of the loading operation, the second mover 200 corrects the loading operation in accordance with the corrected motion plan (S212). Each time the motion plan is corrected, the second mover 200 corrects the motion thereof. If the second mover 200 completes all the motion indicated by the corrected motion plan, the loading operation ends.

Through the series of motions described above, the central control apparatus 400 arranged external to the first mover 100 and the second mover 200 makes the motion plan of the second mover 200 and may perform smoothly the loading operation.

Figure 18:
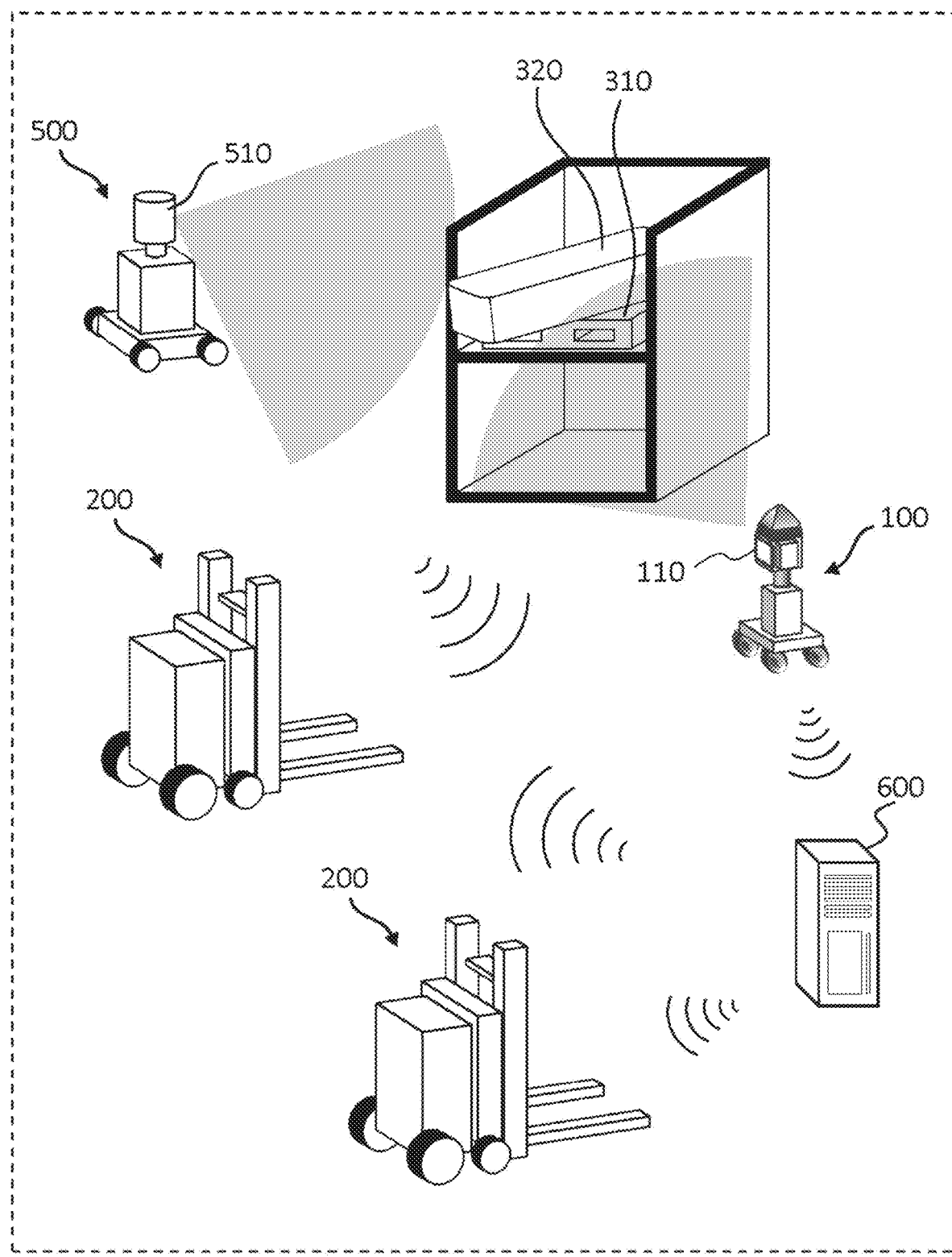
FIG. 18 schematically illustrates an example of a system that senses the load and the second mover using multiple movers.

A variety of modifications of each of the embodiments may be contemplated. For example, a third mover having the same function as the first mover 100 may be used and the motion plan may be made or updated in response to the sensor data acquired by the two movers. FIG. 18 schematically illustrates such a system. The system illustrated in FIG. 18 includes the first mover 100, the second mover 200, a third mover 500, and a processor 600. The third mover 500, like the first mover 100, includes a sensor 510 that outputs the sensor data indicating the three-dimensional distribution of surrounding objects. In this example, the first mover 100 and the third mover 500 sense the surroundings from respective different positions and transmit acquired sensor data to the processor 600. The processor 600 makes or updates the motion plan of the second mover 200 in response to the sensor data acquired by the sensor 110 in the first mover 100 and the sensor data acquired by the sensor 510 in the third mover 500. In this system, the position information on the load 320 and the second mover 200 may be acquired more efficiently by multiple movers having sensors. The number of movers sensing the load 320 and the second mover 200 with sensors thereof is not limited to one or two and may be three or more.

Each mover may be a flying object, such as a drone. In such a case, the loader 210 may be an arm that loads or transfers a load.

The technique disclosed in the disclosure may be applied to a vehicle, such as an unmanned transport forklift, which automatically transports a load in a warehouse or a plant.

What is claimed is:

1. A load transport system comprising:
a first mover;
a second mover that is separately provided from the first mover and performs a job of transporting a load; and
a processor,
wherein the first mover includes:
   a first driver that moves the first mover; and
   a first sensor that outputs sensor data indicating a three-dimensional distribution of objects surrounding the first mover,
wherein the second mover includes:
   a second driver that moves the second mover; and
   a loader that performs an operation of loading the load, and
wherein the processor makes a motion plan to cause the loader of the second mover to operate in response to the sensor data from the first mover.

2. The load transport system according to claim 1, wherein the motion plan comprises information on an amount of movement of the loader.

3. The load transport system according to claim 1, wherein the sensor data is acquired by measuring with the first sensor a measurement region where the second mover, a load shelf, and the load on the load shelf are present.

4. The load transport system according to claim 3, wherein the first driver moves the first mover in response to a relative position of the load with respect to the second mover indicated by the sensor data.

5. The load transport system according to claim 4, wherein the first sensor, after the first mover has moved, acquires the sensor data again and transmits to the processor the sensor data acquired again.

6. The load transport system according to claim 5, wherein the processor updates the motion plan in response to the sensor data acquired again.

7. The load transport system according to claim 1, wherein the processor makes the motion plan in response to the sensor data that the first sensor has output multiple times.

8. The load transport system according to claim 1, wherein the first mover further comprises an actuator that varies a height and/or an angle of the first sensor in response to a state of the load indicated by the sensor data.

9. The load transport system according to claim 1, wherein the processor is mounted on the first mover.

10. The load transport system according to claim 1, wherein the processor is mounted external to the first mover and the second mover.

11. The load transport system according to claim 1, further comprising a third mover including a second sensor that outputs sensor data indicating a three-dimensional distribution of surrounding objects,
wherein the processor makes or updates the motion plan in response to the sensor data acquired by the first sensor and the sensor data acquired by the second sensor.

12. The load transport system according to claim 1, wherein the second mover is a forklift that includes a fork to transport the load placed on a pallet,
wherein the loader includes a lift that raises or lowers the fork, and
wherein the motion plan defines a movement of the second mover and an operation of raising or lowering the fork.

13. The load transport system according to claim 12, wherein if a protrusion of the load from the pallet toward the forklift is detected in view of the sensor data, the processor makes the motion plan that causes the forklift to stop advancing before the forklift collides with the load in an operation that the forklift is moved forward to insert the fork into an aperture of the pallet.

14. A method performed by a computer in a load transport system including a first mover that includes a sensor outputting sensor data indicating a three-dimensional distribution of surrounding objects and a second mover that is separately provided from the first mover and includes a loader performing an operation of loading a load and performs a job of transporting the load, the method comprising:
acquiring the sensor data output from the sensor of the first mover; and
making a motion plan that causes the loader of the second mover to operate in response to the sensor data.

15. The method according to claim 14, wherein the motion plan comprises information on an amount of movement of the loader.

16. A non-transitory computer-readable recording medium storing a computer program causing, to execute a process, a computer in a load transport system including a first mover that includes a sensor outputting sensor data indicating a three-dimensional distribution of surrounding objects and a second mover that is separately provided from the first mover and includes a loader performing an operation of loading a load and performs a job of transporting the load, the process comprising:
- acquiring the sensor data output from the sensor of the first mover;
- making a motion plan of the second mover in response to the sensor data; and
- transmitting to the second mover a control signal that causes the loader of the second mover to operate in accordance with the motion plan.

17. The non-transitory computer-readable recording medium according to claim 16, where the motion plan comprises information on an amount of movement of the loader.

* * * * *